United States Patent
Albertsson et al.

(10) Patent No.: US 7,392,040 B2
(45) Date of Patent: *Jun. 24, 2008

(54) METHOD AND APPARATUS FOR NEGOTIATING MOBILE SERVICES

(75) Inventors: Henrik Albertsson, Stockholm (SE); Krister Dackland, Sundsvall (SE)

(73) Assignee: Telefonaktiebolaget LM Ericcson (publ), Stockholm (SE)

( * ) Notice: Subject to any disclaimer, the term of this patent is extended or adjusted under 35 U.S.C. 154(b) by 75 days.

This patent is subject to a terminal disclaimer.

(21) Appl. No.: 11/202,696

(22) Filed: Aug. 13, 2005

(65) Prior Publication Data
US 2006/0030303 A1 Feb. 9, 2006

Related U.S. Application Data

(63) Continuation of application No. 10/304,253, filed on Nov. 26, 2002, now Pat. No. 7,062,269.

(30) Foreign Application Priority Data
Dec. 5, 2001 (SE) .................................... 0104080

(51) Int. Cl.
H04M 3/42 (2006.01)
(52) U.S. Cl. .................................. 455/414.1; 455/435.2

(58) Field of Classification Search ............. 455/435.2, 455/154.2, 517, 9
See application file for complete search history.

(56) References Cited

U.S. PATENT DOCUMENTS

| | | | |
|---|---|---|---|
| 5,613,213 A * | 3/1997 | Naddell et al. ............ 455/435.2 |
| 6,108,533 A * | 8/2000 | Brohoff .................... 455/414.3 |
| 2002/0077060 A1* | 6/2002 | Lehikoinen et al. ........... 455/41 |
| 2002/0176382 A1* | 11/2002 | Madour et al. .............. 370/331 |
| 2003/0114148 A1 | 6/2003 | Albertsson et al. |
| 2005/0096013 A1* | 5/2005 | Lehikoinen et al. ......... 455/411 |

* cited by examiner

*Primary Examiner*—Creighton Smith
(74) *Attorney, Agent, or Firm*—Thomas Bethea, Jr.

(57) ABSTRACT

A method and apparatus for performing a service negotiation between a mobile terminal and a server offering mobile services. A service request is received from the mobile terminal including a list of requested services, which is compared with a set of available services that the server can provide. It is then determined which services that were requested but are not available and cannot be provided by the server. A delta list is finally transmitted to the mobile terminal comprising the services not available, such that the mobile terminal can determine which services that can be used. A pre-defined tree structure is preferably used for specifying services in the service request and delta lists such that a single root node specifies all services in nodes subordinated to the root node. In this way, the amount of exchanged information and processing in the mobile terminal are reduced.

13 Claims, 2 Drawing Sheets

METHOD AND APPARATUS FOR NEGOTIATING MOBILE SERVICES

CROSS-REFERENCE TO RELATED APPLICATIONS

This application is a Continuation of U.S. application Ser. No. 10/304,253 filed Nov. 26, 2002 now U.S. Pat. No. 7,062,269, which claims the benefit under U.S.C. 35 § 119(a) of the filing date of Swedish Application No SE0104080-7 filed Dec. 5, 2001 (Abandoned) the disclosure of which is fully incorporated herein by reference.

TECHNICAL FIELD

The present invention relates generally to a method and apparatus for negotiating services between a server and a mobile terminal. In particular, the invention is concerned with minimising the amount of exchanged information and processing during service negotiation.

BACKGROUND OF THE INVENTION AND PRIOR ART

Mobile phones have so far been used mostly for making voice calls and for communicating short text messages, such as SMS (Short Message Service) messages. Further, Internet browsing has rapidly become very popular and in recent years, the wireless and Internet domains are converging. Mobile devices are now available, having functionality for connecting to the Internet over a wireless access network to obtain information and services from servers located throughout the world. These mobile devices are equipped with some web browsing functionality, e.g. WAP (Wireless Application Protocol) telephones and PDAs (Personal Digital Assistants).

Today, work is in progress for developing a multitude of new mobile services which will be possible to employ in particular as new technology for mobile communication is introduced, providing greater network capacity and higher transmission bitrates. By way of example, GPRS (General Packet Radio Service) and WCDMA (Wideband Code Division Multiple Access) networks are currently emerging. The contents of the new services will include text, images, audio files and video files in various different formats and combinations. More sophisticated mobile devices are also becoming available on the market, provided with functionalities matching the new services.

In particular, mobile instant messaging and presence services are rapidly becoming very popular. Instant messaging is familiar from the world of fixed desktops, including message status reporting and various group and contact list features. Presence services involve information on the location of other mobile terminals, and enable users to receive messages according to their own created profile and availability. A user profile is mainly personal and may be defined by preferences, interests and hobbies, as well as more temporary factors, such as user availability and moods. Messages can also be delivered depending on present location, availability and capabilities of the user's mobile device.

In order to provide a unified technology for these and other services, specifications and standards are developed for exchanging messages and presence information between mobile terminals, to be fully interoperable with existing Internet and web technologies. If standards are established and fully employed, mobile users may communicate and use the new services globally.

The mobile services are available from service providers by connecting to a server of the service provider, typically over the Internet. A service provider may have one or more physical server entities or a server system. In the following description, the term server represents any combination of physical server entities providing a single access point in the perspective of mobile terminals.

When a mobile terminal connects to a server for making a service request, a service negotiation must first take place for setting up the context of a session and for establishing which services that can be used. The mobile terminal will have certain capabilities, e.g., supporting different means of communication, media types and service features. On the other side, the connected server will support only certain services as well. Since there will be a multitude of mobile terminals having different capabilities, as well as servers supporting different services, only those services can be used that are supported by both the requesting mobile terminal and the server, which will be referred to as "usable services" hereafter. As the usable services have been determined, they are enabled in the mobile terminal and may be presented to a user, e.g., in a menu on a screen.

After some initial login and/or security routine, the service negotiation is initiated by the mobile terminal transmitting a service request message containing a list of requested services. If a mobile terminal receives in response thereto a message from the server containing a list of all the services that are available from the server, the mobile terminal would need to compare the received service list with its own capabilities and calculate which services that can be used out of those offered. This procedure requires signalling transactions of large size and considerable computer processing in the mobile terminal.

It is a problem that mobile terminals typically have a limited computing power capacity and memory capacity, and operate in radio environments with limited bandwidth. Therefore, it is highly desirable that the number of messages and amount of information are minimised during service negotiations for reducing the load on transmission resources. It is also desirable to reduce the processing efforts required in the mobile terminals for executing service negotiations, in order to reduce delays and battery consumption.

SUMMARY OF THE INVENTION

The object of the present invention is to reduce or eliminate the problems outlined above. This object and others are obtained by providing a method and apparatus for service negotiation requiring a minimum of exchanged information and processing power in mobile terminals. This is accomplished by the mobile terminal transmitting a list with the requested services to a server which compares the received request list with a set of services that the server can provide. The server then replies to the mobile terminal by transmitting a delta list of services that are requested but cannot be provided by the server.

The delta list is typically much shorter than a list with the complete set of services that the server can provide, thereby reducing the amount of exchanged information. Hence, the mobile terminal can simply omit the services included in the delta list from the requested service list for obtaining a set of usable services, and no further processing is needed. In this way, the processing activities are reduced in the mobile terminal. The usable services are finally enabled and can be presented in a user interface, e.g., as a menu on a mobile terminal screen.

According to a preferred embodiment of the invention, services in the request list and the delta list are specified as organised in a pre-defined multi-level tree structure having a plurality of hierarchical levels, wherein the service tree structure is known in both the mobile terminal and the server. Each level in the tree structure comprises a number of nodes, each node being subordinated to a higher root node in a level above, except for the highest level.

When transmitting the request list and the delta list, the pre-defined tree structure is used such that all nodes subordinated under a root node in a level above can be specified by the higher root node such that all nodes in any level which are subordinated to a specified node are valid in the list, thereby further reducing the size of exchanged messages.

The invention can be implemented in a server having means for receiving a service request including a list of requested services from a mobile terminal, means for comparing the received request list with a set of available services that the server can provide, means for determining which services that were requested but are not available and cannot be provided by the server, and means for transmitting a delta list to the mobile terminal comprising the requested but not available services, such that the mobile terminal can determine which services that can be used.

The invention can also be implemented in a mobile terminal having means for transmitting a service request including a list of requested services to a server, means for receiving a delta list from the server comprising services that were requested but are not available and cannot be provided by the server, means for determining which services that can be used by omitting the services included in the delta list from the requested service list, and means for enabling the usable services.

In practice, the different means mentioned above in the server and the mobile terminal, respectively, are preferably implemented as software.

BRIEF DESCRIPTION OF THE DRAWINGS

The present invention will now be described in more detail and with reference to the accompanying drawings, in which.

DESCRIPTION OF PREFERRED EMBODIMENTS

Figure 1:
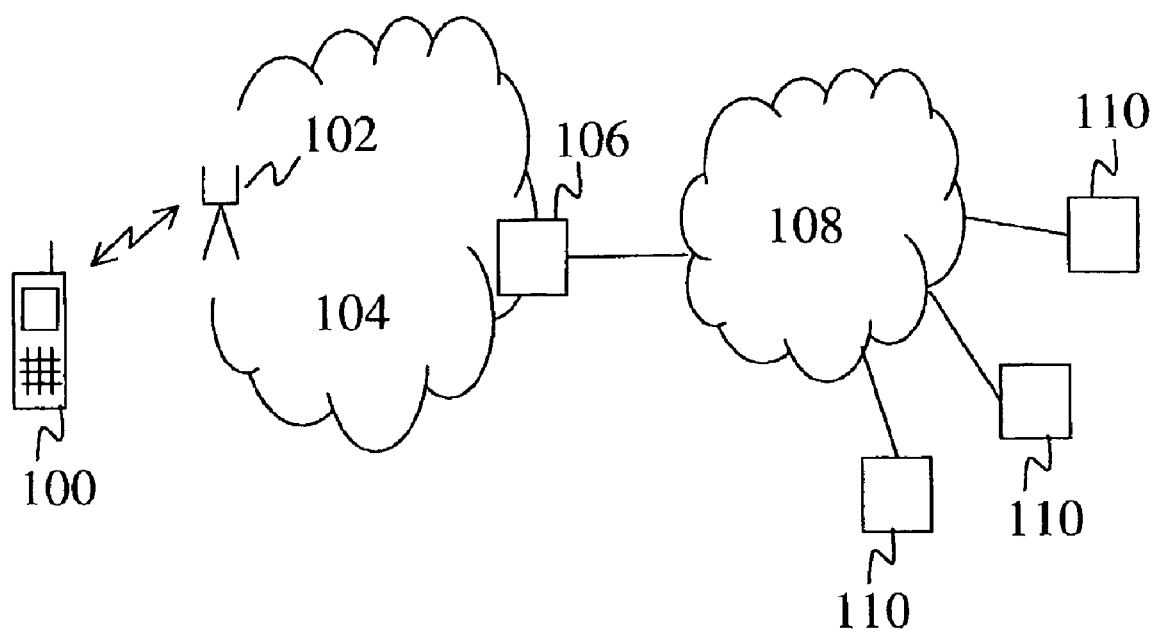
FIG. 1 is a schematic view of a simplified communication scenario for obtaining services in a mobile terminal from a server.

An exemplary simplified scenario for providing services to a mobile terminal from a server is illustrated in FIG. 1, in which the present invention may be implemented. A mobile terminal 100 is connected to a base station 102 of a mobile access network 104 by means of a radio air interface. The mobile network 104 uses standardised communication protocols, such as any of those defined for GSM, TDMA, GPRS, UMTS, etc., for transmission of speech and data over the air interface as well as within the network.

A gateway 106 of the mobile network 104, provides connection for mobile terminals to other networks, such as the Internet 108. For example, the mobile terminal 100 may be a WAP phone and the gateway 106 may be a WAP gateway. A huge number of servers 110, of which only three are shown, are connected to the Internet 108, being capable of providing various services to mobile terminals. Each server 110 may belong to a service provider and is capable of providing a specific set of mobile services, which may be different in different servers.

When a user of the mobile terminal 100 wants to make use of one or more mobile services, suitable commands are entered to the mobile terminal 100 which is then connected to a server 110 over the base station 102, the mobile network 104, the gateway 106 and the Internet 108. Various switches and routers may further be involved in the communication route, although not shown here for simplicity. After connection has been established with the server 110, a suitable login and/or security routine may be executed and a service negotiation is performed before any services can be used. The present invention is not concerned with any specific login or security routines, which will not be described herein.

Briefly described, the service negotiation starts with the mobile terminal 100 sending a service request message to the server 110, including a set of requested services. The server then sends a suitable service response message such that the mobile terminal 100 can determine which services that can be provided from the server 110 and be supported by the terminal. A user of the mobile terminal 100 can then select any service from the determined usable services. The present invention aims at simplifying the service negotiation, and will be described in more detail below.

A service negotiation is a handshake procedure for determining which services can be used during a client server session. After the service negotiation, a session may for example involve sending a message to another mobile terminal using specific features enabled by the usable session services.

In the service negotiation procedure, the mobile terminal 100 first transmits a service request comprising a list with the requested services. The server 110 receiving the service request then compares the received service request list with a set of possible services that the server can provide for determining which services that were requested but cannot be provided by the server. In addition, the server may also consider a user subscription profile for identifying services that the user subscribes to and that the user is entitled to use. The set of all possible services may be stored as a service availability list in a database associated with the server. The user subscription profile may also be stored in a database.

Instead of sending the availability list with the complete set of possible services, the server 110 then replies to the mobile terminal 100 by transmitting a delta list of the determined services that were requested but cannot be provided by the server. The delta list is typically much shorter than the complete availability list, and the amount of exchanged information is thereby reduced. Hence, the mobile terminal 100 receiving the delta list can simply omit the services included in the delta list from the service request list for determining the usable services, and no further processing is needed. The usable services can finally be enabled at the mobile terminal and be presented in a user interface, e.g., as a menu on a screen or as a voice prompt.

Figure 2:
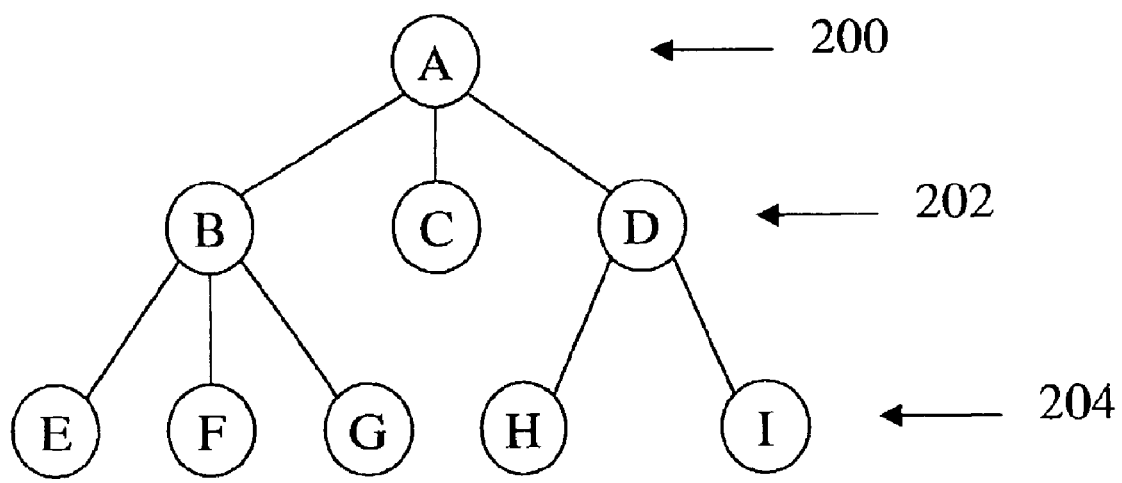
FIG. 2 is a schematic diagram of an exemplary multi-level tree configuration which may be used in the present invention.

In order to further reduce the amount of information exchanged during the service negotiation, the services are preferably organised in a pre-defined multilevel tree structure having a number of hierarchical levels, as exemplified in FIG. 2. The service tree structure must be known in both the mobile terminal 100 and the server 110 according to an agreement, standard or contract. The tree structure can then be utilised as a common coded language for specifying lists of services, using a minimum of information space and processing, as will be described below.

Each level in the multi-level tree structure comprises a number of nodes, each node, except for the top node, being subordinated to a higher node in the next level above. The exemplary tree structure in FIG. 2 comprises three hierarchical levels 200, 202 and 204. The first and highest level 200 includes one top node A and the second level 202 includes three nodes B, C and D, all being subordinated to the root node A in the first level. The third level 204 includes three nodes E, F and G being subordinated to the root node B, and two nodes H and I being subordinated to the root node D.

According to a preferred embodiment, a tree structure is utilised for grouping services together, of which FIG. 2 is but one example. Node A in the first level 200 may represent a system of services, nodes B-D in the second level 202 may represent different service elements, and finally, nodes E-I may represent different detailed service functions. By way of a few straightforward examples, the first 'system' level may comprise a "mail system" node and the second 'service elements' level may comprise "send mails" and "manage mails" as two nodes. The third service functions' level may comprise "send text" and "send pictures" as two nodes under the root node above of "send mails" Further, "read mails" and "delete mails" may be two nodes in the 'service functions' level under the root node above of "manage mails".

As mentioned above, the service tree structure is pre-defined and known by all communicating parties. However, as new services are introduced and old services are phased out, the tree structure can be modified by adding or deleting suitable nodes in a modular manner. All communicating parties must then be updated accordingly. In this way, the services are standardised and can be used globally.

When specifying services during the negotiation procedure, the pre-defined tree structure is used such that a root node specifies all services in nodes subordinated to the root node. All nodes subordinated to a root node in a level above can thus be specified by the root node alone, thereby further reducing the size of exchanged messages. Thus, in the example of FIG. 2, E, F and G can be specified by B. H and I can be specified by D. All nodes A-I can be specified by only A. Consequently, if the service functions E, F and G are requested, the mobile terminal 100 only needs to transmit "B" in a service request list. If only the service functions E and F are supported by the server 110, the transmitted delta list will contain "G". If a full support of services is requested, only "A" needs to be transmitted in a service request list. If then service functions H and I are not supported by the server, the transmitted delta list will contain "D". If all the requested services are supported by the server, the transmitted delta list will be empty or contain a zero indication.

Figure 3:
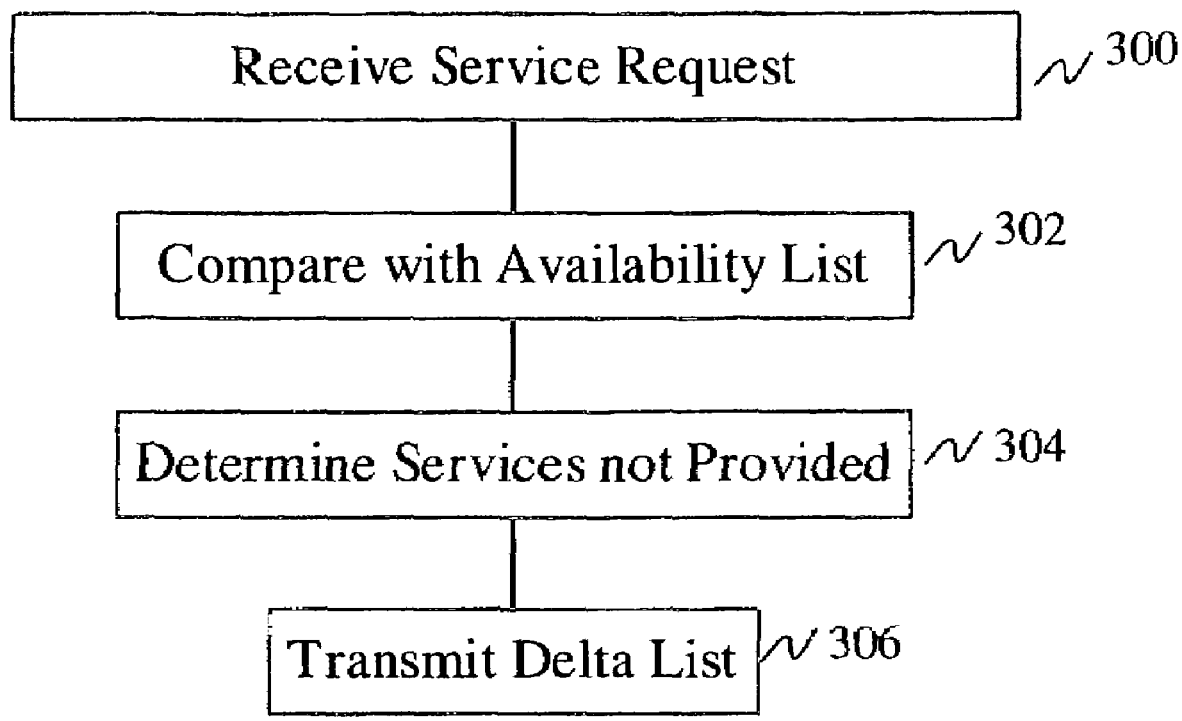
FIG. 3 is a flow chart illustrating the steps executed in a method according to one aspect of the invention.

FIG. 3 illustrates a flow chart for executing the steps in a method for service negotiation according to one aspect of the invention. In a first step 300, a server receives a service request from a mobile terminal, containing a request list of services. Next in step 302, the server compares the received service request list with an availability list or the like including all services that the server can provide, which is stored in the server or in a database associated therewith. The server then determines in a step 304 which services in the service request list that are not included in the stored availability list and cannot be provided by the server. As mentioned above, the server may also consider a user subscription profile for identifying any requested services not included in the user's subscription.

Finally, in a step 306, the server transmits to the mobile terminal a delta list containing the services not available, as determined in step 304. The mobile terminal receiving the delta list can then determine which services out of the requested services that are usable by simply omitting the services in the delta list from those in the transmitted service request list. The usable services can then be enabled at the mobile terminal and be presented to the user, e.g., on a screen or as a voice prompt.

The described inventive service negotiation may be performed automatically by the mobile terminal and the server without requiring efforts from a user. Preferably, the request list includes all services supported by the mobile terminal and needs not be created by the user.

The invention can be implemented in a server having means for receiving a service request including a list of requested services from a mobile terminal, means for comparing the received request list with a set of available services that the server can provide, means for determining which services that were requested but are not available and cannot be provided by the server, and means for transmitting a delta list to the mobile terminal comprising the requested but not available services, such that the mobile terminal can determine which services that can be used.

The invention can also be implemented in a mobile terminal having means for transmitting a service request including a list of requested services to a server, means for receiving a delta list from the server comprising services that were requested but are not available and cannot be provided by the server, means for determining which services that can be used by omitting the services included in the delta list from the requested service list, and means for enabling the usable services to a user.

In practice, the invention is preferably implemented as software for controlling the mobile terminal and the server, respectively.

By using the invention during service negotiation between mobile terminals and servers offering mobile services as exemplified above, a considerable reduction of the amount of exchanged information can be achieved and processing in the mobile terminal is minimised. In this way, transmission resources are saved and delays are reduced, among other things.

While the invention has been described with reference to specific exemplary embodiments, the description is only intended to illustrate the inventive concept and should not be taken as limiting the scope of the invention. Various alternatives, modifications and equivalents may be used without departing from the spirit of the invention, which is defined by the appended claims.

The invention claimed is:

1. A method of performing a service negotiation between a mobile terminal and a serving mobile network offering mobile services, comprising the steps of:
    A) determining a list of services being requested by said mobile terminal,
    B) comparing the received service request list with a set of available services that the mobile network can provide,
    C) determining one or more services that were requested but are not available and cannot be provided by the mobile network for that particular mobile terminal, and
    D) informing, by the mobile network, said mobile terminal of the said one or more services that are not available as determined in step C), such that the mobile terminal can determine which services that can be used.

2. A method according to claim 1, wherein services are organized in a pre-defined multi-level tree structure comprising nodes distributed in a number of hierarchical levels for grouping the services together, wherein a minimum of nodes is used for specifying services in the service request list.

3. A method according to claim 2, wherein a used root node within said multi-level tree structure specifies all services in nodes subordinated to the root node.

4. A method according to claim 1, further comprising the step of determining which services that were requested but cannot be provided by the mobile network, based on a stored user subscription profile.

5. A method according to claim 1, wherein data transmitted in step D) comprises an empty list if it was determined in step C) that all requested services are available and can be provided by the mobile network.

6. A server in a mobile network offering mobile services to mobile terminals, the server comprising:
- means for determining a list of services being requested from a mobile terminal,
- means for comparing the received service request list with a set of available services that the mobile network can provide,
- means for determining a service that was requested by said mobile terminal and cannot be provided by the mobile network, and
- means for transmitting information to said mobile terminal regarding said service that cannot be provided by said mobile network, such that the mobile terminal can determine which service can be used.

7. A server according to claim 6, wherein services are organized in a pre-defined multi-level tree structure comprising nodes distributed in a number of hierarchical levels for grouping the services together, wherein a minimum of nodes is used for specifying services in the service request list.

8. A server according to claim 6, wherein said means for determining which services that were requested but cannot be provided by the mobile network, is based on a stored user subscription profile.

9. A server according to claim 6, further comprising a database storing a service availability list with all services that can be provided.

10. A mobile terminal for using mobile services obtained from a mobile network serving said mobile terminal comprising:
- means for transmitting a service request including a list of requested services to the server, and
- means for receiving information from the mobile network, said information identifying a service that was requested but is not available and cannot be provided by said mobile network.

11. A mobile terminal according to claim 10, wherein the means for presenting the usable services to the user on a screen or as a voice prompt.

12. A mobile terminal according to claim 10 wherein said list is organized in a pre-defined multilevel tree structure comprising nodes distributed in a number of hierarchical levels for grouping the services together wherein a minimum of nodes is used for specific services in the service request list.

13. A method according to claim 3 wherein in response to receiving the identity of a particular node within said service request list, all services associated with subordinate nodes belong to said identified node are further determined to be not available from said server.

* * * * *